United States Patent Office 3,431,585
Patented Mar. 11, 1969

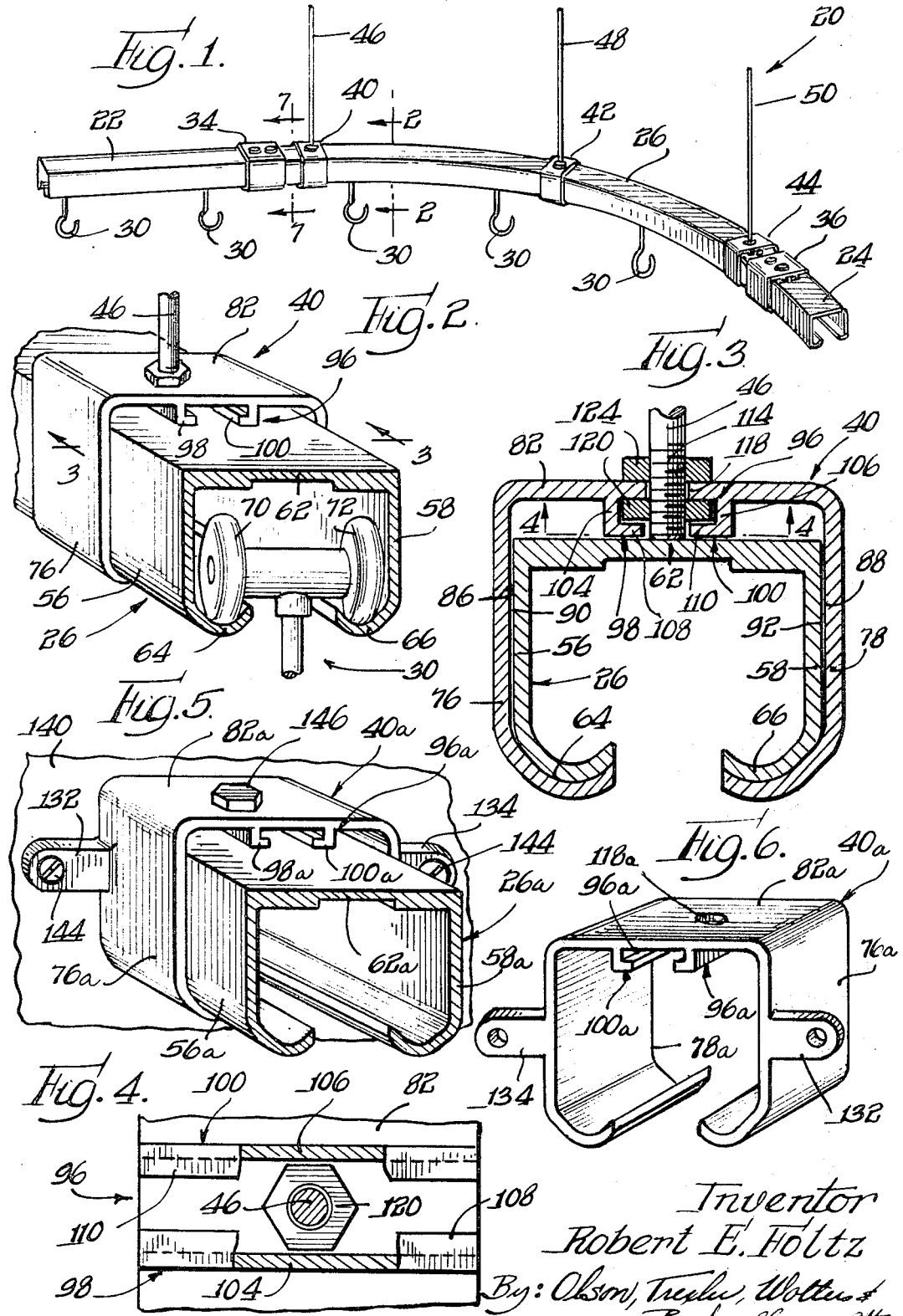

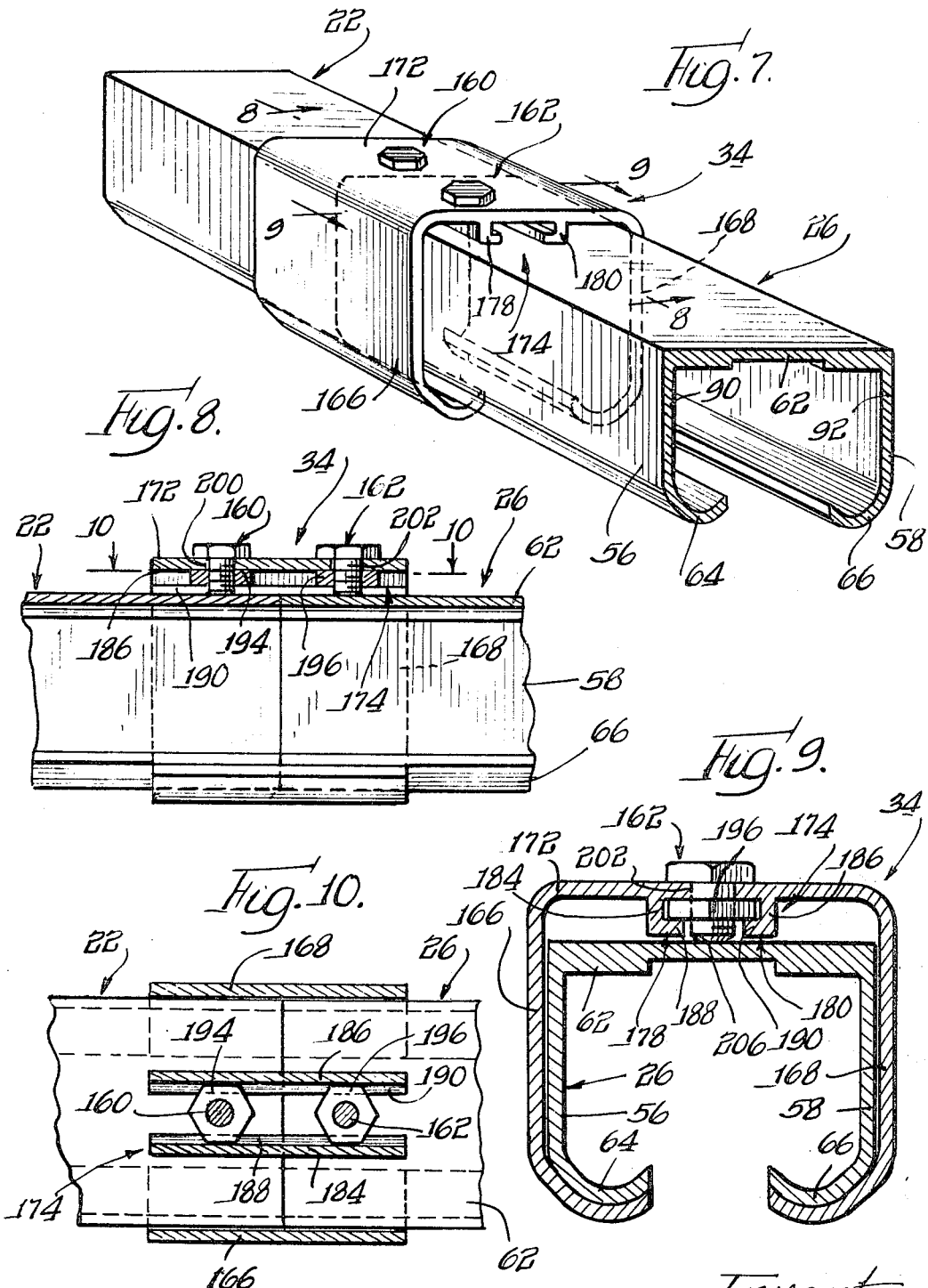

3,431,585
TRACK SUPPORTS
Robert E. Foltz, Sterling, Ill., assignor to Lawrence Brothers, Inc., Sterling, Ill., a corporation of Illinois
Filed Feb. 27, 1967, Ser. No. 618,791
U.S. Cl. 16—94                    8 Claims
Int. Cl. E05d 13/02; E04g 17/18

ABSTRACT OF THE DISCLOSURE

This invention relates generally to support brackets and couplings for track. More particularly, this invention relates to track support brackets and couplings including rail assemblies for positioning connector nuts for engagement with set screws or support rods.

---

Extruded aluminum tracks are commonly used for guiding carriage assemblies to support doors, draperies, screens and tools or parts on assembly or conveyor lines. It is a standard practice to mount tracks used in the aforementioned installations directly on ceiling headers or joists. However, in many installations it is desirable to drop or position the track a substantial distance below the ceiling on support rods. The load on the track is then concentrated in limited areas where the support rods engage the track or support brackets which interconnect the rods and track. The concentrated loads tend to strip threads or otherwise loosen joints between the support rods and the track or brackets.

It is a common practice to use connector assemblies or couplings to join relatively short sections of track. In addition, the connector assemblies are used to interconnect straight and curved sections of track. The prior art connector assemblies have been found to be somewhat unsatisfactory due to installation difficulties which substantially increase the time and effort required to install a track. The prior art connector assemblies have also encountered difficulty in aligning ends of separate sections of track to facilitate smooth movement of a carrier assembly on the track.

Therefore, it is an object of this invention to provide brackets and connector assemblies which overcome the aforementioned limitations of prior art constructions. Specifically it is an object of this invention to provide track supporting brackets and connector structures having rail assemblies which position connector nuts for engagement with set screws or support rods.

Another object of this invention is to provide track support brackets and connector assemblies which are easily and quickly installed for supporting a track.

Another object of this invention is to provide a support bracket for use with a support rod, said support bracket including a connection assembly capable of holding relatively large loads.

Another object of this invention is to provide a connector assembly or coupling which accurately aligns ends of track sections joined by the coupling to enable a carrier to roll smoothly between sections of track.

Another object of this invention is to provide track support brackets and coupling assemblies which are formed of a first metal of a relatively low tensile strength and associated with threaded mounting members formed of a second metal of a relatively high tensile strength whereby a relatively large load can be transmitted from the track to the mounting members.

These and other objects and features of the invention will become more apparent on a consideration of the following detailed description taken in connection with the accompanying drawings wherein:

FIG. 1 is a perspective view of an installation wherein sections of track are supported and interconnected by brackets and couplings forming preferred embodiments of the invention;

FIG. 2 is an enlarged perspective view, taken on the line 2—2 of FIG. 1, illustrating the relationship of a support bracket to a track and a carriage assembly;

FIG. 3 is an enlarged sectional view, taken along the line 3—3 of FIG. 2, further illustrating the relationship of the track and support bracket;

FIG. 4 is an enlarged sectional view, taken along the line 4—4 of FIG. 3, illustrating the relationship of a support or connector nut to the support bracket;

FIG. 5 is an enlarged perspective sectional view of a second embodiment of the support bracket wherein the support bracket is fixedly connected to a mounting wall or surface;

FIG. 6 is an enlarged perspective view of a support bracket of FIG. 5;

FIG. 7 is an enlarged perspective sectional view, taken along the line 7—7 of FIG. 1, illustrating the relationship of two section of track to a coupling or connector assembly;

FIG. 8 is an enlarged sectional view, taken along line 8—8 of FIG. 7, further illustrating the relationship of the coupling assembly to the track;

FIG. 9 is an enlarged sectional view, taken along the line 9—9 of FIG. 7, illustrating the relationship of a set screw to the coupling and track; and FIG. 10 is an enlarged sectional view, taken along the line 10—10 of FIG. 8, illustrating the relationship of a connector or suport nut used in association with the set screw of FIG. 9, and a rail assembly.

A track installation or assembly 20 is shown in FIG. 1 wherein sections of straight track 22 and 24 are interconnected by a section of curved track 26. The sections 22, 24 and 26 of track support a plurality of carriers or carriages 30 having hooks or eye bolts for supporting tools or other conveyed articles. It should be understood that the carriages 30 could also be fitted to support doors, screens, draperies or curtains. The sections of track are fixedly mounted relative to the ceiling by track support assemblies including extruded aluminum couplings 34 and 36 which interconnect outer or end portions of the track sections and extruded aluminum brackets 40, 42 and 44 which are connected to inner portions of the track sections. The brackets 40, 42 and 44 are supported by risers or rods 46, 48 and 50 which are connected to suitable brackets on the ceiling. The couplings 34 and 36 are substantially identical in construction, as are the brackets 40, 42 and 44. Therefore, only the bracket 40 and coupling 34 will be discussed in detail, it being apparent that the other brackets and couplings are of the same construction.

The bracket 40 and track 26 can be seen in greater detail in FIGS. 2 and 3. The track 26 is integrally formed from extruded aluminum and has the same cross section as the track sections 22 and 24. The track 26 includes a pair of inwardly facing J-shaped leg or side wall sections 56 and 58. The leg sections 56 and 58 of a track 26 are interconnected by a cross or connector wall or section 62 which extends between upper end portions of the leg sections 56 and 58. The leg sections 56 and 58 have generally hook-shaped lower end sections 64 and 66 which are engaged by wheels 70 and 72 of the carriage or carrier 30 (see FIG. 2). The wheels 70 and 72 roll along on inner surfaces of the hooked end sections 64 and 66 of the legs 56 and 58 as the carriage 30 is moved along the track 26.

The bracket 40 has a cross section which is generally similar, though larger in shape, to the cross section of the track 26. The bracket 40 includes a body formed by a pair of inwardly facing J-shaped leg or side wall sections 76 and 78 which are interconnected by a cross or connector section or wall 82. The bracket 40 is slid or moved onto the track 26 with inner surfaces 86 and 88 of the J-shaped leg sections 76 and 78 in abutting engagement with outer surfaces 90 and 92 of the track 26 (see FIG. 3). The leg sections 76 and 78 of the bracket 40 engage the leg sections 56 and 58 of the track 26 to support the track in the position shown in FIG. 1.

The bracket 40 also includes a rail assembly or structure 96 which is integrally formed with the connector wall 82 of the body section. The rail structure or assembly 96 includes a pair of oppositely facing generally L-shaped guide tracks 98 and 100 having downwardly or inwardly projecting leg sections 104 and 106 and transversely projecting flanges 108 and 110. The body section and rail assembly 96 are advantageously a unitary structure formed of extruded aluminum. It should be noted that the leg sections 76 and 78 of the bracket 40 are slightly longer than the leg sections 56 and 58 of the track 26 to provide room for the rail assembly 96 between the parallel spaced apart connector section 82 of the bracket and the connector section 62 of the track.

The support rod 46 has an externally threaded end section 114 which extends through an aperture or hole 118 in the connector section 82 to engage internal threads in a support nut or connector member 120. As is perhaps best seen in FIG. 4, the nut 120 is slideable relative to the rail assembly 96 to position the nut in alignment with the aperture 118 in the connector section 82 of the bracket 40. Sides of the nut engage the legs 104 and 106 of the tracks 98 and 100 to hold the nut against rotation relative to the bracket 40 as the support rod 46 is turned into threaded engagement with the internal threads in the nut 120.

As the support rod 46 is threaded into the nut 120 an end of the rod 46 engages an outer or upper surface of the connector section 62 of the rail 26. The rod 46 then presses the J-shaped leg sections 56 and 58 of the track 26 firmly into abutting engagement with the J-shaped leg sections 76 and 78 of the bracket 40. If desired, the innermost end of the rod 46 can be advantageously provided with a circular cutting edge for penetrating or cutting into the connector section 62 of the track 26 to prevent longitudinal movement between the track and the bracket 40. As the threaded rod 46 is screwed against the connector section 62 of the track, an opposite reactive force is exerted against the nut 120 to force the nut upwardly or outwardly against the inner surface of the connector section 82. A lock or jam nut 124 is advantageously mounted on the threaded end portion 114 of the rod 46 to engage an outer surface of the connector section 82 of the bracket 40 to prevent the rod 46 from unscrewing from the nut 120 and decreasing the downward force exerted by the rod against the track 26.

The rod 46 and nut 120 are advantageously formed of steel so that the threads of the rod and nut are not stripped when a heavy load is applied to the track 26. In addition, to enabling the track to carry a relatively heavy load, the steel threads will not be stripped or otherwise damaged when the rod is tightened against the track 26. If the rod 46 were screwed directly into threads formed in the connector section 82 of the aluminum bracket 40, the threads would tend to strip when a heavy load is applied to the track 26 or when the rod is tightened against the track due to the relatively low tensile strength of aluminum. By utilizing the steel nut 120, large forces can be distributed over a relatively large area of the aluminum bracket by an upper or face surface of the nut without damage to either the bracket or the nut. Since the nut 120 and support rod 46 are formed of steel having a relatively high tensile strength, there is no danger of the external threads on the rod 114 or internal threads of the nut 120 being stripped or otherwise damaged.

A second embodiment of the bracket is shown in FIGS. 5 and 6. The embodiment of FIGS. 5 and 6 is substantially similar to the embodiment of FIGS. 2 and 3 and therefore parts in FIGS. 5 and 6 which are similar to parts in FIGS. 2 and 3 are designated with similar numerals with the suffix letter a being added in FIGS. 5 and 6 to distinguish the components of FIGS. 5 and 6 from those of FIGS. 2 and 3. A bracket 40a of FIGS. 5 and 6 includes a pair of transversely extending ears or tabs 132 and 134 which are integrally formed with and extend outwardly from side walls 76a and 78a respectively. The ears or tabs 132 and 134 are advantageously connected to a support wall or surface 140 with screws 144 or other suitable connection means. A steel set or lock screw 146 is provided for engagement with a steel nut to press leg sections 56a and 58a of the track 26a against leg sections 76a and 78a of the bracket 40a, in the same manner as in which the rod 46 engages the nut 120 in the embodiment of FIGS. 2 and 3 to press the track 26 against the bracket 40. The set screw 146 is used in the embodiment of FIGS. 5 and 6 since the bracket 40a is fixedly mounted on the support wall 140. However, if further support is required, a rod, similar to the rod 46, could be used in place of the set screw 146. It is contemplated that the bracket 40a will be used to terminate dropped ceiling track installations and for supporting draperies, cubicle curtains, canvas screens, and other objects.

In view of the foregoing description, it is apparent that the extruded aluminum brackets 40 through 44 are slid onto the extruded aluminum rail. Steel nuts 120 are then positioned on the rail assemblies 96 in alignment with apertures 118 in the connector sections 82 of the brackets. The steel support rods 46 through 50, with lock nuts 124 turned up as far as they will go on the threaded end portions 114 of the rod, are then inserted through the apertures 118 into engagement with the nuts 120. The rods are rotated or turned until their innermost end surfaces engage the connector sections 62 of the track 26 to press the leg sections 56 and 58 of the track against the leg sections of the brackets. The reactive force resulting from pressing the track against the brackets is transmitted by the steel nuts 120 to the connector sections 82 of the brackets. When the support rods 46 through 50 have been tightened against the track 26, the lock nuts 124 are then tightened against outer surfaces of the brackets to prevent the nuts 120 from loosening on the support rods and decreasing the pressure between the track 26 and the brackets 40 through 44. Since the rods 46 through 50 and the nuts 120 are formed from steel which has a relatively high tensile strength, there is no danger of stripping the threads on the rods or nuts as the opposing forces are applied to the track and brackets by the rods and nuts.

The bracket 40a is advantageously used to terminate a track installation or assembly against a support wall 140. The bracket 40a is slid onto the track 26a and then connected to the wall 140 by suitable connection means such as the screws 144. After the track has been mounted in the bracket 40a, a head portion of the set screw 146 is rotated to press the legs 56a and 58a of the track 26a against the legs 76a and 78a of the bracket 40a in much the same manner in which the rod 46a is turned to press the track 26 against the bracket 40.

The coupling or connector assembly 34 is shown in FIG. 7. The coupling 34 interconnects the straight track section 22 and curved track section 26. As was previously mentioned, the two track sections have substantially the same cross-sectional configuration. In view of the preceding detailed description of the configuration of the track section 26, further description of the track section 22 is not believed to be necessary. From an examination of FIGS. 7 through 10 it is apparent that the coupling 34 is formed in much the same manner as is the bracket 40, the coupling 34 having a somewhat longer longitudinal length and a pair of set screws 160 and 162 to interconnect the two track sections 22 and 26.

Referring now to FIG. 9, taken in connection with FIGS. 7 and 8, the coupling 34 has a body section formed by a pair of inwardly facing J-shaped leg sections or side walls 166 and 168. The legs 166 and 168 are interconnected by a cross or connector wall or section 172 to complete the body section of the coupling 34. A rail assembly 174 includes a pair of generally L-shaped oppositely facing guide tracks 178 and 180 and extends downwardly or inwardly from the connector section 172. The guide tracks 178 and 180 each include leg sections 184 and 186 from which flanges 188 and 190 project toward each other. The body section and the rail assembly 174 are advantageously a unitary structure formed of extruded aluminum.

A pair of steel nuts 194 and 196 are mounted on the rail assembly 174 in alignment with apertures 200 and 202, as shown in FIG. 8, for engagement with the set screws 160 and 162. The nuts are held against rotation relative to the set screws 160 and 162 by the leg sections 184 and 186 of track assembly 174 which engage side surfaces of the nuts 194 and 196, as shown in FIG. 10. The set screws 160 and 162 have external threads which mate with internal threads in the nut or connector members 194 and 196. When the set screw 162 is screwed or turned into the nut 196 an innermost end of the set screw engages an upper surface of the connector section 62 of the track 26. The set screw 160 similarly engages the track 22. As the set screws are tightened the nuts are pressed against the connector section 172 of the coupling 34 and the leg sections of the tracks 22 and 26 are pressed against the leg sections of the coupling 34 in much the same manner as in which the support rod 46 and nut 120 press the track 26 against the bracket 40. The set screws 160 and 162 and the nuts 194 and 196 are advantageously formed of relatively high tensile strength steel so that the threads are not stripped or otherwise damaged by the force exerted between the tracks 22 and 26 and coupling 34.

The set screws 160 and 162 press end portions of the tracks 22 and 26 into substantial alignment, as shown in FIGS. 8 and 10, to provide a smooth continuous support track for the carrier 30. The set screws 160 and 162 are advantageously provided with a cutting edge, indicated at 206 in FIG. 9, for penetrating, cutting engagement with the connector section 62 of the tracks 22 and 26. The combined effect of the engagement of the set screws 160 and 162 with the connector sections of the tracks 20 and 22 and the pressing engagement of the track against the legs of the coupling securely interconnects the tracks 22 and 26 and prevents them from being moved longitudinally relative to each other.

In view of the foregoing remarks it is apparent that the couplings 34 and 36 interconnect the tracks 22, 24 and 26 and align outer end portions of the tracks to provide a smooth continuous track assembly on which the carriers 30 can be easily rolled. The couplings 34 and 36 advantageously include body sections and rail assemblies which are extruded as an integral structure from lightweight aluminum. Steel set screws 160 and 162 and nuts 194 and 196 are mounted on the body sections and rail assemblies to interconnect and align outer end portions of abutting track sections. If desired in a particular installation, support shafts, similar to the shafts 46 through 50, can be used in place of set screws 160 and 162.

As can be seen by a comparison of FIGS. 3 and 9, the couplings 34 and 36 have substantially the same cross sectional configuration as the brackets 40 through 44. It can also be seen that the couplings and brackets both utilize externally threaded members, that is the set screws or support rods, for engagement with internally threaded members, that is the nuts, to press the track firmly against inwardly facing substantially J-shaped leg sections. In both the coupling structure and bracket structure, the internally and externally threaded members are formed of steel having a relatively high tensile strength so that the track can be pressed firmly against the associated leg sections without stripping the threads. Of course, the similarity in cross section of the couplings and brackets enables both of them to be extruded from the same die with resulting saving in production costs.

In the track installation 20 of FIG. 1 the couplings have been used to interconnect straight and curved sections of track while the brackets have been used to support a curved section of track. It will be apparent to those skilled in the art that the couplings can be used to interconnect either straight or curved sections of track and that the brackets 40 through 44 can be used to support either straight or curved sections of track. It will also be apparent to those skilled in the art that the rail assemblies 96 and 174 could, if desired, be extruded projecting outwardly from the brackets and couplings rather than projecting inwardly as shown. However, if the rail assemblies were formed projecting outwardly from the brackets and the couplings, the reactive force from the support shafts and set screws on the steel nuts would be exerted against the relatively small flanges of the guide tracks rather than the relatively large surface area of the connector sections. In addition, it is contemplated that the rail assemblies could be formed from a continuous U-shaped structure rather than the pair of L-shaped guide tracks. If the rail assemblies were formed from a continuous U-shaped structure the hole or aperture would be drilled through both the connector sections 82 and 172 and the generally U-shaped rail assembly to enable the support shafts or set screws to project into engagement with the tracks. It will also be apparent to those skilled in the art that the components of the track installation 20 can be formed from materials other than the one specified, it being preferred to use relatively lightweight aluminum for the track, brackets, and couplings in order to reduce the weight of the track installation while steel is utilized for the threaded members to eliminate stripping or damaging threads. Therefore, while particular embodiments of the invention have been shown, it should be understood, of course, that the invention is not limited thereto since many modifications may be made.

What is claimed is:

1. A track support assembly comprising: a body section for supporting engagement with a track means; and a rail assembly connected to said body section for holding an internally threaded member which is engaged by an externally threaded member, said rail assembly including a pair of oppositely facing, generally L-shaped guide tracks projecting inwardly from the body section to hold said internally threaded member against rotation relative to said body section, said guide tracks extending longitudinally along the length of said body section to enable said internally threaded member to be moved longitudinally of said body section into substantial alignment with an aperture in said body section through which said externally threaded member extends, said externally threaded member extending through said internally threaded member into abutting engagement with said track means to hold said body section against movement relative to said track means.

2. An assembly as set forth in claim 1 wherein: said body section and the rail assembly are integrally formed of a first metal of a relatively low tensile strength and said internally and externally threaded members are formed of a second metal of a relatively high tensile strength whereby said internally threaded member is capable of transmitting a relatively large load between said body section and said externally threaded member.

3. An assembly as set forth in claim 1 wherein: said body section includes a pair of inwardly facing generally J-shaped leg sections; and said track means includes a pair of inwardly facing generally J-shaped leg sections positioned with outer surfaces in abutting engagement with inner surfaces of the leg sections of said body section, the leg sections of said track means being pressed against the leg sections of said body section by said externally threaded member to position said track means relative to said body section.

4. An assembly as set forth in claim 2 wherein: said externally threaded member is a shaft extending between said internally threaded member and a support member to support said track means.

5. An assembly as set forth in claim 2 wherein: said internally threaded member is a set screw having a head positioned adjacent an outer surface of said body section for adjusting the position of a set screw relative to said track means.

6. An assembly as set forth in claim 5 wherein: said body section includes a plurality of transversely extending mounting tabs for connecting said body section to a support means.

7. An assembly as set forth in claim 3 wherein: said J-shaped leg sections of said track means are interconnected by a first wall; said J-shaped sections of said body section are longer than the leg sections of said track means and are interconnected by a second wall; and said rail assembly and internally threaded member are positioned intermediate said first and second walls to transmit pressure from said internally threaded member to said second wall when said externally threaded member engages said track means to press the leg sections of said track means against the leg sections of said body means.

8. An assembly comprising: a track for supporting a carriage means, said track including first and second inwardly facing generally J-shaped leg sections interconnected by a connector section; an integrally formed body means having first and second inwardly facing generally J-shaped leg sections interconnected by a connector section, outer surfaces of the leg sections of said track being positioned in abutting engagement with inner surfaces of the leg sections of said body means; a rail assembly integrally formed with the connector section of said body means and positioned between the connector section of said body means and the connector section of said track; an internally threaded member slidably mounted on said rail assembly and held against rotation by said rail assembly in substantial alignment with an aperture in the connector section of said body means; and an externally threaded member extending through both the aperture in said body means and said internally threaded member into engagement with the connector section of track, said externally threaded member being in threaded engagement with said internally threaded member to press the internally threaded member against an inner surface of the connector section of said body means and to press the outer surfaces of the leg sections of said track against inner surfaces of the leg sections of said body means to fixedly interconnect said body means and said track in a predetermined relationship to support said track.

References Cited

UNITED STATES PATENTS

| | | | |
|---|---|---|---|
| 509,650 | 11/1893 | Brodie | 16—94 |
| 922,877 | 5/1911 | Kahn | 52—710 |
| 1,422,473 | 7/1922 | Phillips | 16—94 |

BOBBY R. GAY, *Primary Examiner.*

A. M. CALVERT, *Assistant Examiner.*

U.S. Cl. X.R.

248—323